July 21, 1953  R. ALBRECHT  2,645,936
TABLET HARDNESS TESTING MACHINE
Filed July 8, 1949  2 Sheets-Sheet 1

INVENTOR.
BY Robert Albrecht
Albert Jacobs
ATTORNEY.

July 21, 1953 R. ALBRECHT 2,645,936
TABLET HARDNESS TESTING MACHINE
Filed July 8, 1949 2 Sheets-Sheet 2
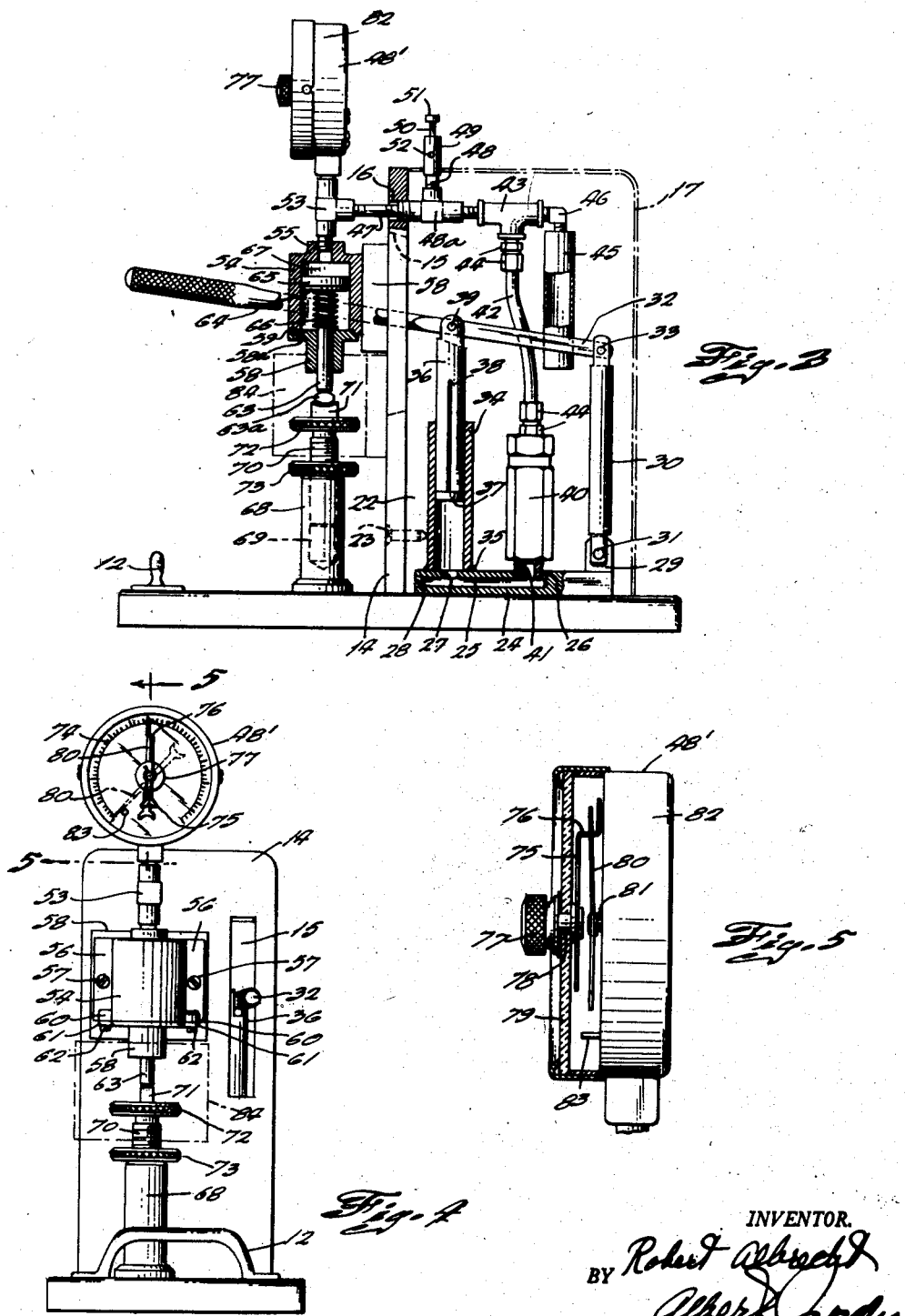
INVENTOR.
BY Robert Albrecht
Albert Jacobs
ATTORNEY.

Patented July 21, 1953

2,645,936

UNITED STATES PATENT OFFICE 2,645,936

TABLET HARDNESS TESTING MACHINE

Robert Albrecht, Cleveland, Ohio, assignor, by mesne assignments, to Strong Cobb & Company, Inc., Cleveland, Ohio, a corporation of Delaware Application July 8, 1949, Serial No. 103,630

2 Claims. (Cl. 73—94)

The present invention relates to a machine for testing or determining the hardness or resistance to crushing of pharmaceutical and other tablets.

In the manufacture of tablets, of which large numbers are manufactured for the pharmaceutical industry, it is often advantageous to have such tablets of known or predetermined strength and other physical characteristics in order that they may not only meet the pharmaceutical requirements necessary for the particular kind of tablets involved, but so that they will not prematurely disintegrate during shipment, storage and handling. So far as I am aware there is no simple, inexpensive device by means of which the hardness of such tablets, or their resistance to crushing can be readily and accurately determined. This is important not only for reasons already indicated but in order that the automatic tableting machines on which such tablets are fabricated may be adjusted in the event that they are not producing tablets of the correct or required physical characteristics.

It is, accordingly, one of the objects of the present invention to provide for the first time a simple, relatively inexpensive and positively operated machine for rapidly and accurately testing the resistance to crushing of pharmaceutical and other tablets.

Another object of the invention is to provide a simple testing machine of a pneumatic type in which a tablet can be inserted and the pressure upon such tablet gradually raised until it disintegrates, said machine being actuated by a simple manual pumping operation or from a compressed air line by means of a standard pressure regulator.

A still further object of the invention resides in a tablet hardness testing machine which is characterized by its extreme simplicity and rapid action as well as its adjustability to tablets of different dimensions and its versatility with respect to crushing strengths within a rather wide range.

Other and further objects of the invention reside in the various structural combinations, sub-combinations and elements hereinafter described and claimed, and in such other and further features as will be understood and appreciated by those skilled in this art.

In the accompanying drawings in which I have illustrated a preferred embodiment of the invention and in which like numerals designate corresponding parts throughout the various views:

Fig. 3 is a side elevational view, partly in section, illustrating the spatial arrangement and organization of the parts.

Fig. 4 is a front elevational view of my new tablet hardness testing machine and Fig. 5 is a view partly in section and partly in elevation taken along the line 5—5 of Fig. 4 but on a somewhat enlarged scale.

Figures 1, 2:
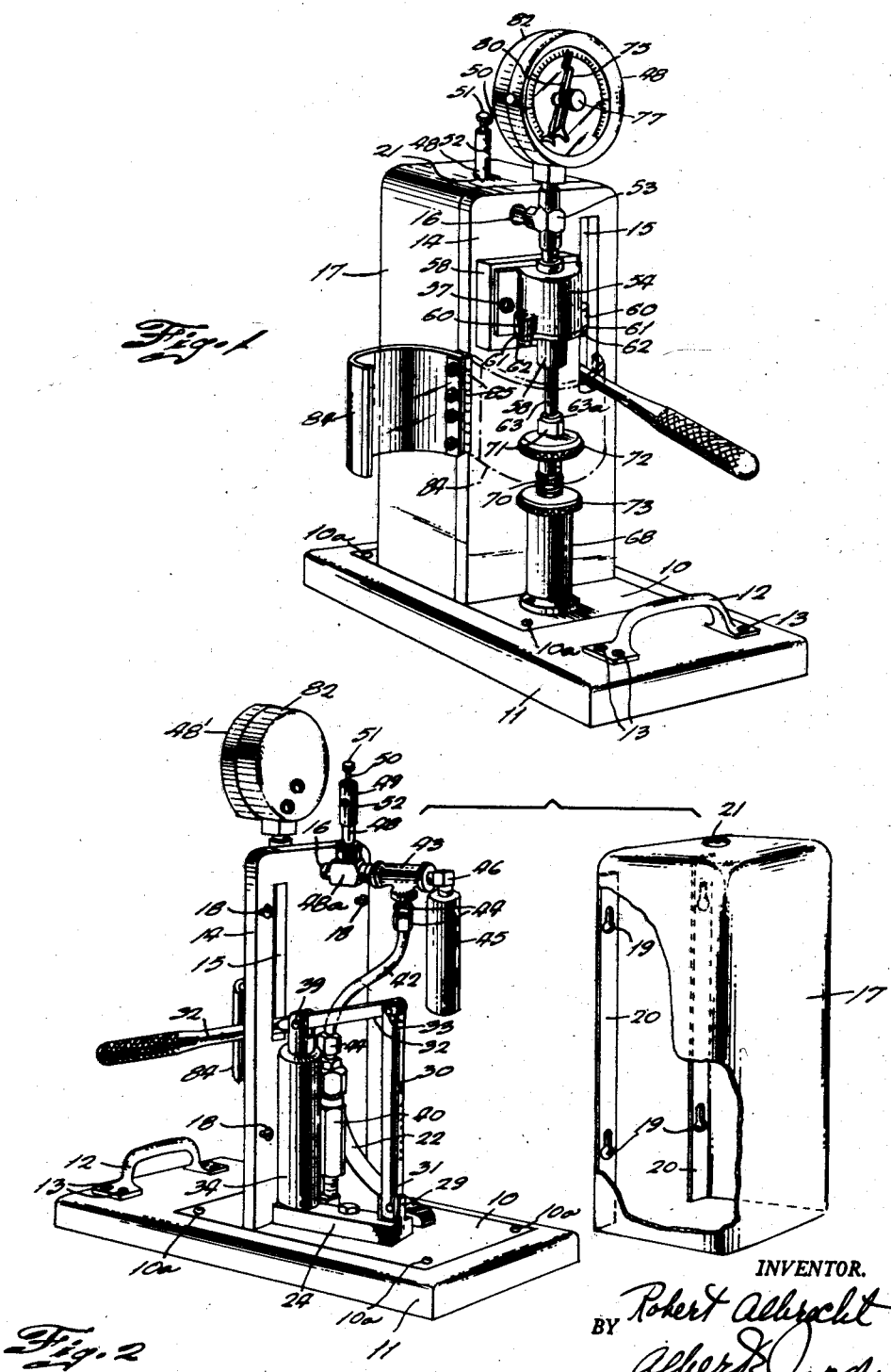
Fig. 1 is a perspective view of a tablet hardness testing machine responding to the present invention and showing the guard member in open position to avoid obscuring parts which are normally behind the same.
Fig. 2 is also a perspective view of my new tablet hardness testing machine but taken from the rear of Fig. 1 and with the housing removed in order to expose the parts therewithin.

Referring now to the drawings in detail, it will be observed that the machine comprises a suitable base plate or member 10 which may, if desired or preferred, be countersunk in and secured to a portable wooden or other support member 11 (at 10a) which is provided with a suitable carrying and steadying handle 12 secured as by screws 13 to the support. Rising vertically from the base plate 10 is a partition member 14 made of cast metal such as aluminum or any other suitable metallic or non-metallic material and provided along one side in the upper portion thereof with a vertical slot 15. Member 14 is also provided with a suitable transverse aperture 16 near the upper edge thereof and the slot 15 and aperture 16 constitute passages for effecting communication between those parts of the machine which are on opposite sides of the said partition member and to enable actuation from the exterior of the machine.

Those portions of the machine which are on the back or rearward side of the partition member 14 are normally enclosed within the removable metal housing or casing 17 which protects and conceals the parts therewithin. This housing 17 forms with vertical partition 14 a boxlike enclosure and is separably connectable therewith by means of inverted keyhole slots 19 in inturned rearward flanges 20 of the housing which cooperate with studs or screws 18 projecting rearwardly from partition member 14 as shown in Fig. 2. As will be noted from Figs. 1 and 3 the upper surface of the housing is provided with an aperture 21 through which one of the parts (the relief valve) of the machine projects, for a purpose to be explained hereinafter. Adequate strength and relative immovability are imparted to the vertical partition member 14 with respect to the meal base plate 10 by means of the triangular brace 22 which is secured both to the base and to the vertical partition in any suitable way as by soldering or welding, or the use of fastening instrumentalities such as screws or the like 23.

Mounted upon and suitably rigidly secured to said base 10 is a bored or hollow block 24 the rearward portion of which is solid and the forward portion of which is provided with a horizontal passageway 25 having a plurality of vertical communicating apertures 26 and 27. The forward end of the horizontal passageway 25 is normally closed as by means of a removable plug such as that indicated by the numeral 28. The rearward end of the block 24 is provided with a suitable connecting extension such as the upstanding apertured lug 29 to which the lower bifurcated end of the rod 30 is fulcrumed by the pin or stud 31. The mounting arrangement is such that the lower end of the rod is able to pivot somewhat about the pin 31 in response to forward and backward movements of the upper end of the rod 30 which is also bifurcated for the reception of the rearward apertured end of the actuating handle 32 which is connected therein by means of a pin or stud 33. The actuating handle extends through slot 15 and has its distal end enlarged and knurled to facilitate its operation.

A vertically disposed pump cylinder 34 is mounted on the upper forward surface of the block 24 and communicates with the passageway 25 in said block via the communicating aperture 27 already referred to. Pump cylinder 34 is suitably secured to said block as by means of solder indicated by the fillet 35 or in any other suitable way. A cylindrical plunger or piston 36 is mounted for vertical reciprocatory movement within the pump cylinder 34 and this piston is provided at its lowermost end with a flexible washer 37, preferably composed of leather, although it may be of rubber or any other suitable material. The piston is also provided with one or more spaced shallow vertical grooves 38 and preferably four (4) such grooves are provided and disposed at an angle of 90 degrees to each other. The upper end of the piston is bifurcated similarly to the rod 30 and is pivotally connected to an intermediate portion of actuating handle 32 which fits therein and is secured thereto as by a pin, stud or the like 39.

A special check valve designated by the numeral 40 and manufactured by the Mansfield and Green Company is disposed adjacent pump cylinder 34 and its lower end communicates with the passageway 25 in the block 24 via a coupling 41 which may take the form of an externally threaded hollow sleeve threadedly engaging the aperture 26 in the said block and connecting the same with the lower end of said special check valve. This special check valve, the structural details of which constitute no limitation on the invention and the operation of which will be set forth hereinafter, is connected by means of an offset copper tubing 42 or other conduit member to the center opening of the T-shaped fitting 43, the copper tube or conduit being removably locked in position in air-tight manner by means of the locking assemblies 44.

Connected into one end of the T-shaped fitting 43 is a small hollow cylindrical pressure tank 45 which depends from a connecting elbow 46 joining the upper end of the tank with said T-shaped fitting. From the other end of the T-shaped fitting a pipe 47 leads forwardly to an indicating pressure gauge 48' calibrated in pounds per square inch, or in any other desired units of measurement, and interposed in this pipe line 47 is a pressure relief valve 48 which, as shown, is a standard automobile pneumatic tire valve (mounted in a T-shaped fitting 48a) provided with a special cap which comprises a cylindrical body portion 49 having the lower end of its bore threaded for engagement with the external threaded upper end of the tire valve and a plunger made up of a rod or shank 50 which is movable vertically through an aperture in the closed upper end of said cap and which terminates in an enlargement 51 at each end so as to prevent disassembly and to provide a fingerpiece for manual operation as well as a member for depressing the valve insides when pressure is to be relieved from the pneumatic system. The cap 49 is also provided with one or more transverse openings in its side wall as indicated at 52 which serve as ports for the air released from the pneumatic system by depressing fingerpiece 51.

By means of a further T-shaped fitting 53, the gauge 48' and pipe 47 are connected into the upper end of a hollow cylinder 54 (a Mead air clamp) which is provided with a boss 55 on its upper end which is apertured for the reception of the union 56 associated with said T-shaped fitting 53. The cylinder 54 is provided with lateral flanges 56 at its rearward side which are connected, as by fastening instrumentalities 57, to the block 58 vertically mounted on the forward surface of the vertical partition member 14, said block being secured to the partition in any suitable or desired manner as by welding or brazing. The lower end of said cylinder 54 is open and normally closed by means of a gland 58 (having a vertical port 58a) which is rabbeted, as shown at 59, to the cylinder and held in place by cooperating laterally projecting lugs 60 and 61 on the cylinder and gland, respectively, which are held together by upwardly extending screws or the like 62.

As will be best observed from Fig. 3, a vertical plunger 63 is mounted for movement within the cylinder 54 through the gland 58, terminating somewhat below said gland and having a beveled end terminating in a slightly concave lowermost surface for acting upon a tablet such as that indicated by 63a in Fig. 3. Plunger 63 forms a close frictional fit within the bore of gland 58 and terminates at its upper end in an enlarged disk or annular flange 64 upon which is suitably connected a cup-shaped member 65 which is preferably composed of rubber but which may also be composed of any other suitable flexible or resilient material. Between the upper surface of the gland 58 and the lower surface of the disk or flange 64 a helical spring 66 is interposed and mounted, which normally urges the plunger upwardly and which is adapted to become compressed under the influence of increasing pressure in the space 67 above the cup-shaped member 65 and in the pneumatic system as a whole. It will be noted that the disk or flange 64 has a diameter which is slightly less than the internal diameter of the cylinder 54 and that the cup-shaped member 65 has a diameter which is at least substantially equal to the internal diameter of said cylinder so that it is normally in contact with the inner wall thereof.

Mounted upon said base plate 10 somewhat forwardly of said vertical partition member 14 is a vertical standard or support constituting an anvil base 68 which is provided with a threaded recess 69. A threaded stem 70 is adapted to engage the said threaded recess and terminates at its upper end in a slightly concave anvil 71 which serves as a support for the tablet 63a or other article to be tested. The stem 70 is provided with a fixed annular enlarged flange 72 having a knurled outer circumferential surface by means of which stem 70 can be readily turned in a clockwise or counter-clockwise direction to adjust the height of the anvil surface. The stem 70 is further provided with a similar threaded enlargement 73 which serves as a locking member for holding the anvil surface in its adjusted position, it being understood that the position of the anvil can be raised or lowered in order to test articles of other thicknesses or sizes.

The indicating gauge 48' is of the maximum registering type and is of known or conventional construction per se forming no part of or limitation upon the invention. This gauge is provided with a dial having a suitable scale 74 calibrated, as already indicated, in pounds per square inch or other units of measurement and provided with a manually movable maximum indicating hand 75 having an intermediate offset portion 76. This hand can be manually moved or reset by means of the enlarged knurled knob 77 which has a shank 78 passing through the glass 79 or other transparent material over the face of the gauge. This type of gauge is also provided with a standard indicating hand 80 which is connected to a spindle 81 which is responsive to pressure changes within the rearward portion of the gauge casing 82 and the pneumatic system of the machine. The zero point of the gauge is also provided with a stop pin 83 in the customary manner. The machine is completed by the provision of a transparent plastic (Lucite or Plexiglas) guard 84 of semi-circular shape which is horizontally hinged at 85 along one edge of the vertical partition member 14 so that it can be swung into open or closed position, as required (full and dotted line positions, respectively, of Fig. 1).

In operating my new testing machine, a tablet is placed upon the anvil surface which has previously been adjustably set and locked in the proper position for a tablet of that size. The transparent guard which has been swung open is now closed, i. e. moved from that position shown in full lines in Fig. 1 to the position shown in dotted lines thereon. Both indicator hands of the gauge are also in the zero position. The enlarged forwardly extended portion of the operating handle is then grasped and moved upwardly and downwardly within the limits of the vertical slot in the partition member. As each stroke is completed the pressure in the system above described gradually increases as can be observed from the movement of the indicator hands on the gauge and as further observable from the downward movement of the plunger toward the tablet on the anvil. As the pumping action is continued, the plunger comes down upon the tablet, approaches closer and closer to the anvil surface and eventually reaches a point at which the tablet will disintegrate or fly into fragments at which time the pumping action is immediately stopped. By examining the gauge it can be readily determined what the hardness or resistance to crushing was for that particular tablet. After suitable observation or notation has been made as to the test figure for that tablet, the pressure is released from the pneumatic system of the machine by depressing the rod in the special cap by exerting a downward pressure on the enlargement at the upper end thereof. This immediately causes the pressure within the system to be relieved as can be noted by the surge of air coming out through the aperture(s) in the special cap and by the fact that the main indicating hand of the gauge promptly returns to zero. The maximum indicating hand, however, stays in the position to which it had been moved by the action of the main indicating hand against the offset portion of the maximum indicating hand and hence the test figure remains available as long as desired or needed, and when the next test is to be carried out the knob on the dial is turned in a counter-clockwise direction until the maximum indicating hand is also at zero. At this time the entire machine is ready for another cycle since the release of the pressure from the pneumatic system has also caused the plunger to retract or move upwardly under the influence of its encircling helical spring above described. In the event that the operating handle is in a position above the lowermost position in the slot the same drops to its lowermost position when the pressure is relieved from the pneumatic system and hence the entire machine is then ready for another test and cycle of operation.

During the operation of the device and as succeeding strokes of the operating handle are effected, the movement of the piston 36 within the cylinder 34 causes compression of increments of air which are aspirated into the pump via the grooves 38 and the flexing of the leather washer 37 at the lower end of such piston so that each compressed increment of air is forced through the aperture 27 into the passageway 25 and thence upwardly through aperture 26 and the special check valve, filling the tank 45 and, when the pressure has increased sufficiently, acting to depress the plunger 63 toward the anvil 71, the pressure within the pneumatic system being meanwhile registered by the gauge. Air in cylinder 54 below member 65 is exhausted through port 58a as the plunger descends. The pneumatic system is air-tight and is of relatively small capacity so that the testing operation requires only a very short period of time of the order of about 10 seconds, but this time may vary somewhat depending upon the rate at which the operating handle is actuated and the relative sizes of the various parts.

When the machine is non-manually operated from a compressed air line, the pressure is gradually raised by turning the standard regulator screw on the pressure regulator or any other suitable valve or needle valve. This standard pressure regulator is well-known and therefore has not been illustrated but it can be connected into the pneumatic system at any point behind the relief valve 48, as into the T-connector 43 which is provided with a top aperture and inlet connection for that purpose or at any other suitable or convenient location.

The foregoing description is intended as illustrative and not as limitative since various changes may be made therein without departing from the nature or principles of the invention which are, rather, of the scope defined by the appended claims.

What I claim is:

1. A testing machine comprising a base plate, a vertical partition member rising from said base plate intermediate the ends of such plate, a housing attachable to and detachable from one side of said partition member and forming a protective enclosure, a bored block mounted on said base plate within said enclosure, a pump cylinder mounted on said block and communicating with the bore thereof, a piston movable within said cylinder, a check valve adjacent said pump cylinder and also communicating with said block bore, a pressure tank suspended within said enclosure and communicating with said check valve, a relief valve connected to and communicating with said check valve and said tank, said relief valve having its operable portion extending through an aperture in the top of said housing, an air clamp cylinder mounted on the other side of said vertical partition member and connected to and communicating with said relief valve, a pressure gauge of the maximum indicating type connected into and communicating with said air clamp cylinder and said relief valve and an anvil mounted on said base plate beneath said air clamp cylinder which latter includes a plunger which is normally spring-urged in an upward direction away from said anvil and which is forced by pressure created in the system by said pump toward said anvil for testing purposes.

2. A testing machine comprising a support, a bored block mounted on said support, a pump means mounted on said block and communicating with the bore thereof, a check valve adjacent said pump means and also communicating with said block bore, a pressure tank carried by the support and communicating with said check valve, a relief valve connected to and communicating with said check valve and said tank, an air clamp cylinder connected to and communicating with said relief valve, a pressure gauge connected into and communicating with said air clamp cylinder and said relief valve, and an anvil mounted on said support opposite said air clamp cylinder which latter includes a plunger which is normally biased in a direction away from said anvil and which is forced by pressure created in the system by said pump means toward said anvil for testing purposes.

ROBERT ALBRECHT.

References Cited in the file of this patent

UNITED STATES PATENTS

| Number | Name | Date |
|---|---|---|
| 1,367,133 | Guillery | Feb. 1, 1921 |
| 1,847,402 | Loughead | Mar. 1, 1932 |
| 1,967,664 | Dick | July 24, 1934 |
| 2,041,869 | Smith et al. | May 26, 1936 |
| 2,224,248 | Blum et al. | Dec. 10, 1940 |
| 2,296,160 | Gross | Sept. 15, 1942 |
| 2,414,550 | Patch | Jan. 21, 1947 |

FOREIGN PATENTS

| Number | Country | Date |
|---|---|---|
| 242,067 | Germany | Dec. 20, 1911 |